United States Patent [19]

Achar et al.

[11] Patent Number: 4,499,260
[45] Date of Patent: Feb. 12, 1985

[54] PHTHALOCYANINE POLYMERS

[75] Inventors: Bappalige N. Achar, Karnataka, India; George M. Fohlen, Millbrae; John A. Parker, Los Altos, both of Calif.

[73] Assignee: The United States of America as represented by the Administrator of the National Aeronautics and Space Administration, Washington, D.C.

[21] Appl. No.: 440,656

[22] Filed: Nov. 10, 1982

[51] Int. Cl.³ .................... C08G 73/10; C08G 73/20
[52] U.S. Cl. ................................ 528/229; 528/125; 528/126; 528/128; 528/166; 528/185; 528/186; 528/187; 528/226; 528/352; 528/353
[58] Field of Search ............. 528/186, 187, 352, 353, 528/226, 229, 166, 185, 125, 126, 128

[56] References Cited

U.S. PATENT DOCUMENTS

| 2,153,300 | 4/1939 | Dahlen et al. |
|---|---|---|
| 2,277,588 | 3/1942 | Haddock . |
| 2,286,679 | 6/1942 | Heilbron et al. . |
| 3,179,630 | 4/1965 | Endrey . |
| 3,485,796 | 12/1969 | Naselow . |
| 3,518,232 | 6/1970 | Bell . |
| 3,532,673 | 10/1970 | Bell, Jr. et al. ............. 528/186 |
| 3,546,181 | 12/1970 | Arnold ............. 528/353 |
| 3,681,284 | 8/1972 | Grundschober et al. ............. 528/353 |
| 3,804,804 | 4/1974 | Gerber et al. ............. 528/186 |
| 3,890,274 | 6/1975 | D'Alelio . |
| 3,996,196 | 12/1976 | D'Alelio . |
| 3,998,786 | 12/1976 | D'Alelio . |
| 4,026,871 | 5/1977 | D'Alelio . |
| 4,251,417 | 2/1981 | Chow et al. . |

*Primary Examiner*—Lester L. Lee
*Attorney, Agent, or Firm*—Darrell G. Brekke; John R. Manning; Robert D. Marchant

[57] ABSTRACT

Method of forming 4,4',4",4'''-tetraamino phthalocyanines by reducing 4,4',4",4'''-tetranitro phthalocyanines, polymerization of the metal tetraamino phthalocyanines with a tetracarboxylic dianhydride (preferably aromatic) or copolymerization with a tetracarboxylic dianhydride and a diamine (preferably also aromatic) to produce amic acids which are then dehydrocyclized to imides. Thermally and oxidatively stable polymers result which form tough, flexible films, etc.

40 Claims, 3 Drawing Figures

M = Cu, Co, Ni 4,499,260

1

PHTHALOCYANINE POLYMERS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

FIELD OF THE INVENTION

The invention relates to a method of synthesizing metal 4,4′,4″,4‴tetraamino phthalocyanines (1)

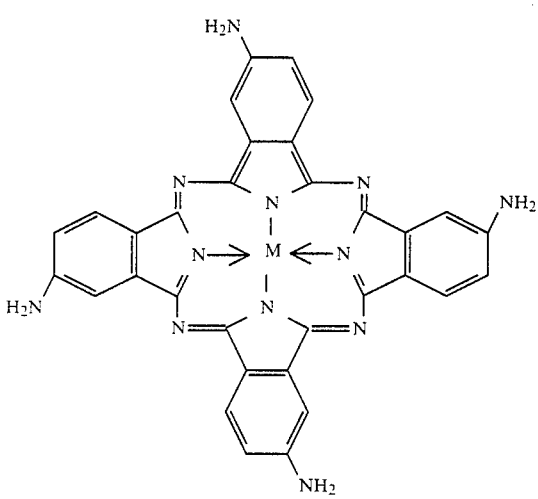

M = Cu, Co, Ni, ...

wherein M is a metal and to the production of polymers with dianhydrides and preferably also with diamines and to the cyclization of the resulting polymers.

BACKGROUND OF THE INVENTION

The remarkable thermal stability and resistance to chemical attack coupled with the properties such as color, catalytic activity, electrical and photo-conductivity has attracted wide interest to the phthalocyanine class of compounds. Polymers having this unit in their back-bone are expected to display high thermal stability up to 500° C. Many previous attempts have been made to use the highly conjugated aromatic ring structure of phthalocyanines in the preparation of thermally stable polymers, but in most cases insoluble and infusible powders of low thermal stability have been obtained. In many of the cases they were found to undergo decomposition in air around 350° C. This failure to obtain the anticipated thermal stability may be due to (1) low degree of polymerization with structural inhomogenieties, (2) impurities and (3) the presence of connecting groups having poor thermal stability. The low degree of polymerization is due to the steric hindrance caused by the large size of the phthalocyanine molecule. The characteristic insolubility and the chemical inertness of phthalocyanines have made it difficult to obtain polymeric material of high molecular weight.

The imide linkage is known to be very stable and has good moisture resistance in many polymeric materials. Phthalocyanine polymers incorporating this linkage, and using procedures favoring the formation of a high degree of polymerization, are expected to show high thermal stability. Synthetic procedures for making phthalocyanine polymers having imide linkages are disclosed in U.S. Pat. Nos. 3,890,274 and 3,996,196, but the procedures used to obtain either oligomeric or polymeric phthalonitrile terminated imide compounds is susceptible to giving a mixture of various side reaction products. Further, unless one uses the exact theoretical amount of metal salt to convert the end-group phthalonitriles to the phthalocyanine structure, formation of isoindoline or triazine is also possible. To suppress the formation of these side products, if one uses excess metal salt or metallic powder, there is a greater chance of incorporation of these impurities in the resulting polymers. Structural inhomogeneities or the presence of impurities will result in polymers having poor thermal stability and other undesirable properties.

OBJECTS OF THE INVENTION

Among the objects of the invention are the provision of a superior method of preparing a metal phthalocyanine monomer which is capable of polymerization to yield metal phthalocyanine polymers which are thermally stable; to provide a method whereby phthalocyanine monomers may be polymerized to a high molecular weight polymer which has good thermal stability; to provide novel polymers of a phthalocyanine monomer which have high molecular weight and are heat resistant and are capable of forming tough flexible films, heat resistant coating materials, adhesives, fibers and other useful end products.

BRIEF SUMMARY OF THE INVENTION

In accordance with the invention the metal 4,4′,4″,4‴tetraamino phthalocyanine 1 is prepared in purer form from heretofore by reaction of a soluble compound of the metal M, 4-nitrophthalic acid, urea and a catalyst in a suitable solvent to produce the metal 4,4′,4″,4‴tetranitro phthalocyanine 2.

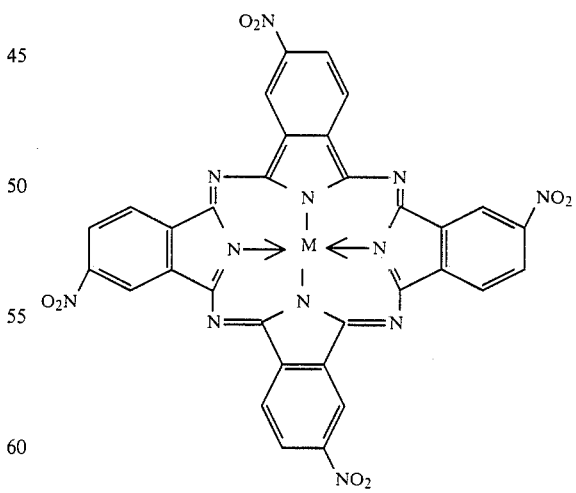

and the nitro groups are reduced to amino groups. In formulas 1 and 2M represents the chosen metal, preferably a divalent metal having an atomic radius of about 1.35 Å. The resulting tetraamino compound 1 is then polymerized with a dianhydride

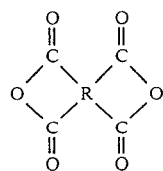

wherein R is an organic group, preferably an aromatic group, to produce polymer 4

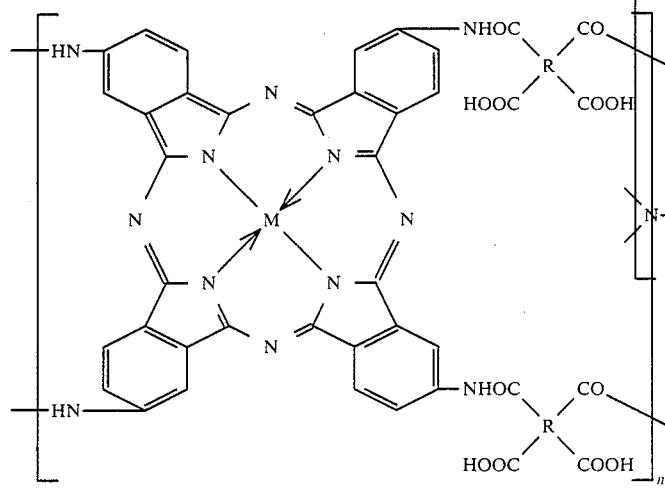

n being a number indicating the degree of polymerization. This polymer (an amic acid) is then dehydrocyclized to produce a polymer having the recurring unit

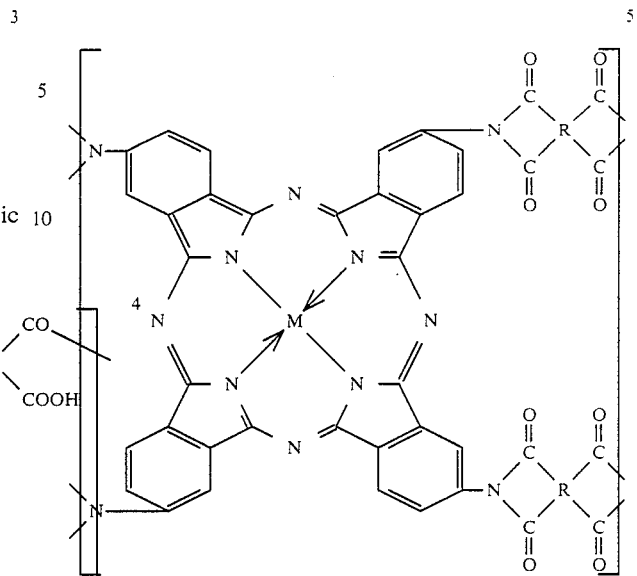

Further, a mixture of the tetraamino monomer 1, a dianhydride 3 and a diamine 6

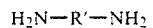

(wherein R' is a bivalent organic group) may be copolymerized to result in a copolymer (the polyamic acid form) 7 which is then dehydrocyclized to yield a copolymer 8 as follows:

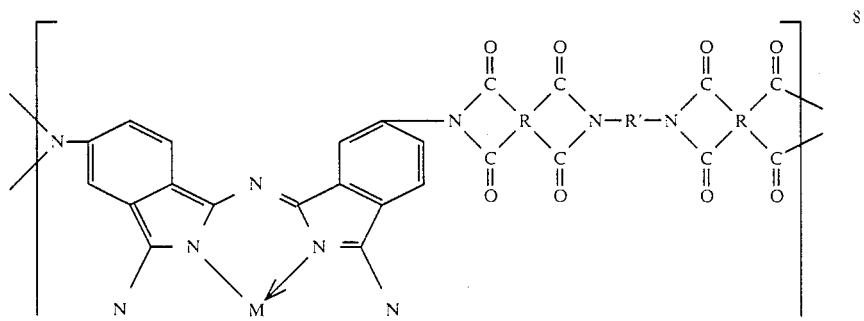

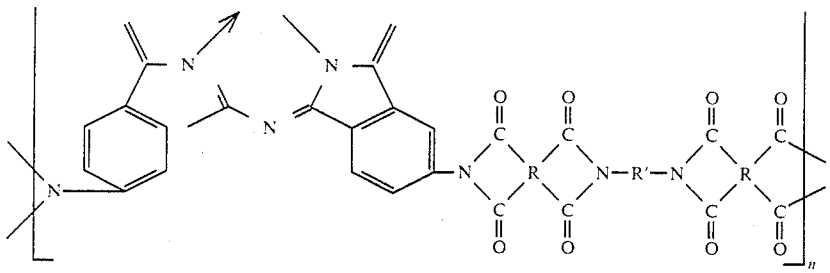

For convenience of reference, FIGS. 1, 2 and 3 illustrate the invention as follows:

DETAILED DESCRIPTION OF THE INVENTION

EXAMPLE 1

Copper (II) 4,4',4'',4'''-Tetranitro Phthalocyanine (2a)

Figure 1:
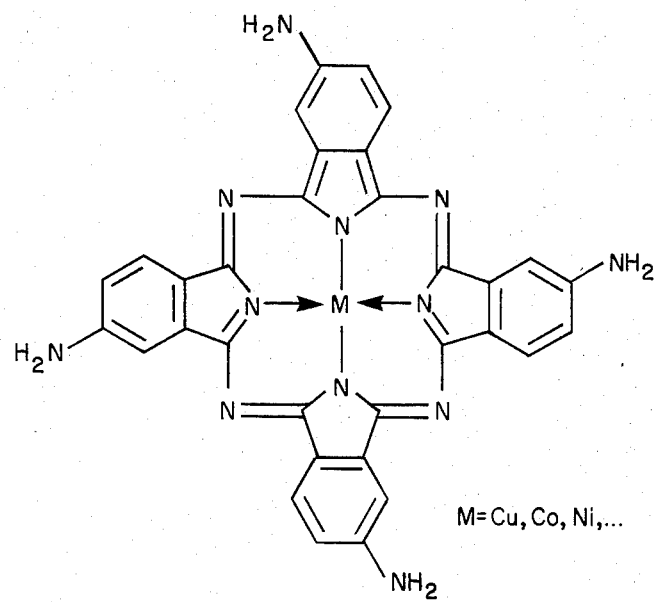
FIG. 1 shows the structure of metal 4,4',4'',4'''-tetraamino phthalocyanine.
Figure 2:
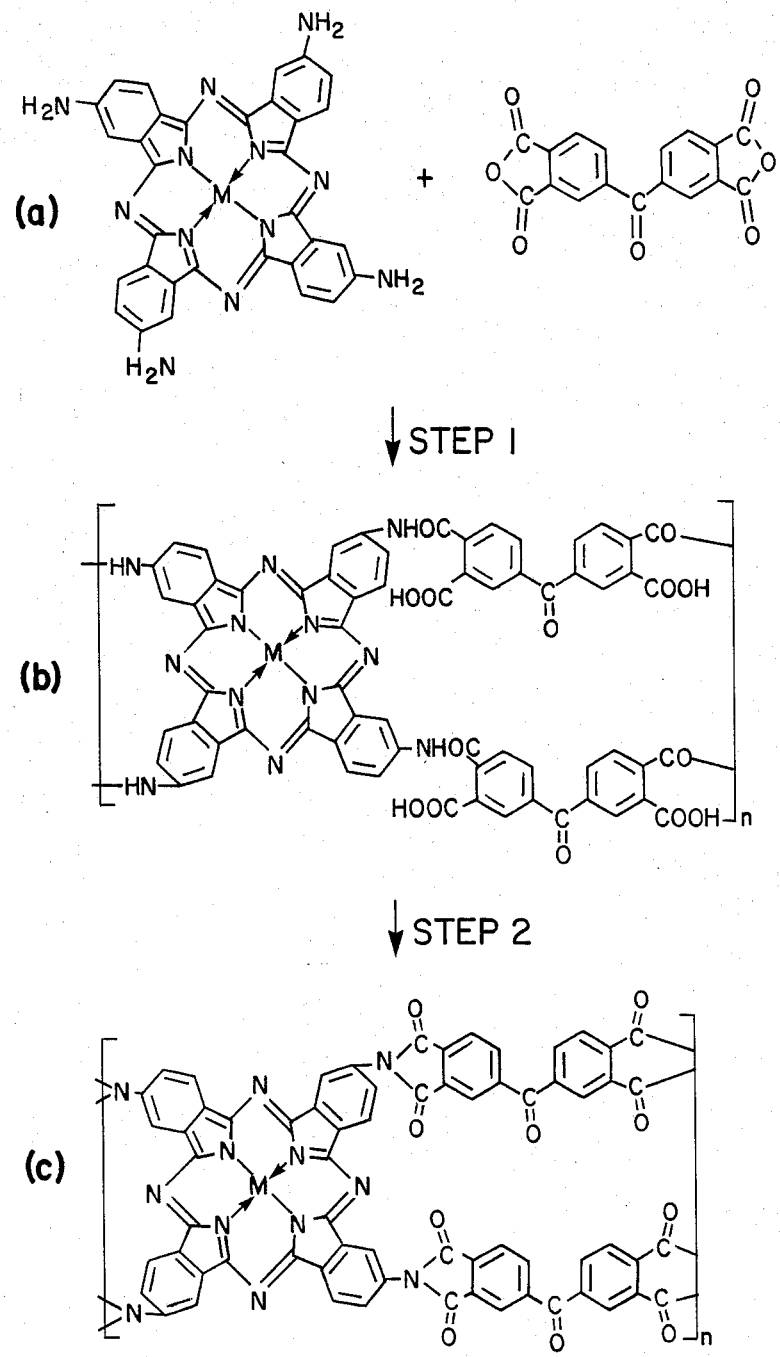
FIG. 2 shows the steps involved in producing an amic acid polymer from the phthalocyanine of FIG. 1 and a dianhydride (illustrated by 3,3',4,4'-benzophenone tetracarboxylic dianhydride (step 1) and dehydrocyclizing the amic acid to an imide (step 2).
Figure 3:
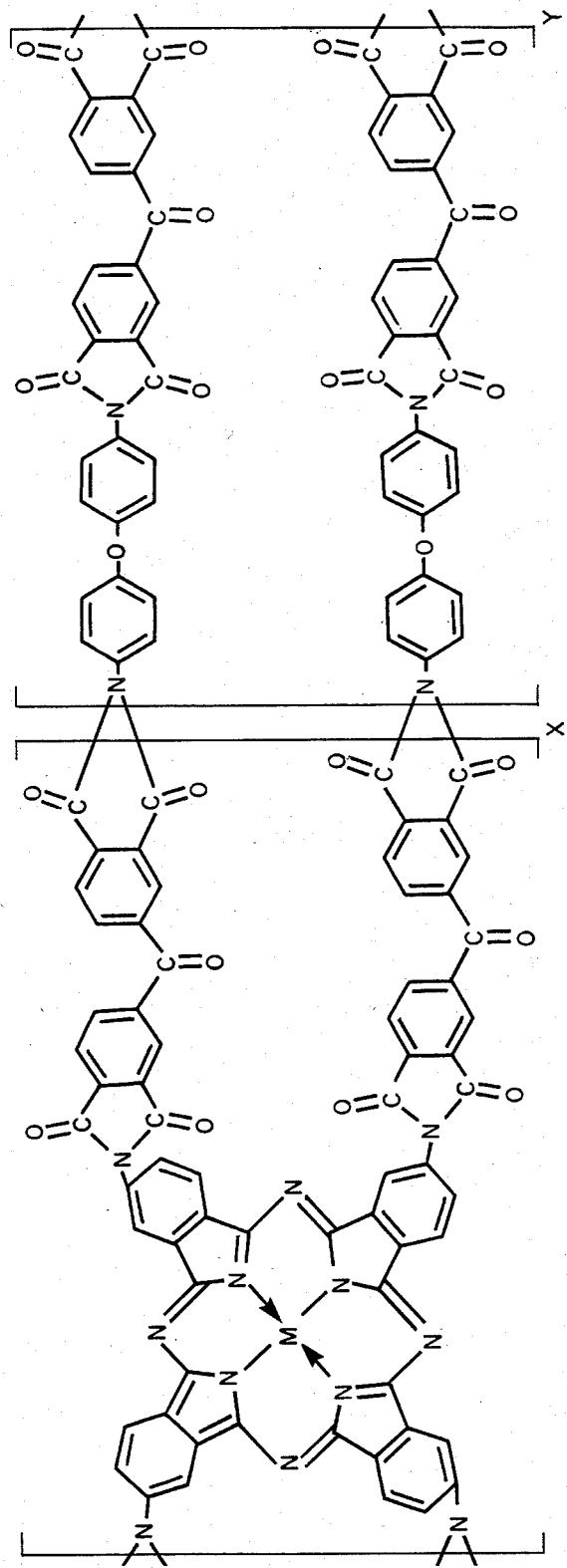
FIG. 3 illustrates a copolymer resulting from copolymerizing the same MPTA and the same dianhydride with 4,4'-diaminodiphenyl ether and dehydrocyclizing the resulting amic acid.

This has the structure of 2 above wherein M is Cu(II).

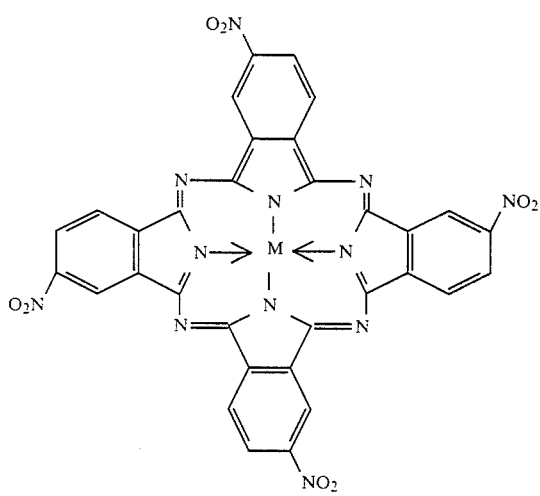

12.0 g copper sulfate pentahydrate, 37.0 g 4-nitrophthalic acid, 4.5 g ammonium chloride, 0.5 g ammonium molybdate and excess urea (50–60 g) were finely ground and placed in a 500 ml three-necked flask containing 25 ml of nitrobenzene. The flask was provided with a thermometer, condenser and a mechanical stirrer. The temperature of the reaction mixture was slowly increased to 185° C. and maintained at 185°±5° C. for 4.5 hours. The color of the reaction mixture gradually deepened and finally a deep colored solid was obtained.

The product was finely ground and washed with alcohol until free from nitrobenzene. The solid product was added to 500 ml of 1.0N hydrochloric acid saturated with sodium chloride, boiled for about 5 minutes, cooled to room temperature and filtered. The resulting solid was treated with 500 ml 1.0N sodium hydroxide containing 200 g sodium chloride and heated at 90° C. until the evolution of ammonia ceased. The solid product after filtration was treated with 1.0N hydrochloric acid and separated by centrifugation. Alternate treatments with hydrochloric acid and sodium hydroxide were repeated twice. The copper (II) 4,4'4''4'''-tetranitro-phthalocyanine was washed with water until chloride free. The blue complex was dried at 125° C. in vacuum for 1 hour. Its formula was verified by chemical and infrared analyses.

EXAMPLES 2 AND 3

Cobalt and Nickel 4,4',4'',4'''tetranitro phthalocyanine (2b and 2c)

These were prepared by the same method using cobalt and nickel in place of the copper salt of Example 1. In each case the structure was that of formula 2 wherein M=Co (II) and Ni (II), respectively. Their structures were verified by chemical and infrared analyses.

EXAMPLE 4

Copper (II) 4,4',4'',4'''-tetraamino phthalocyanine (1a)

This had the structure 1 wherein M=Cu (II).

About 10 g of finely ground copper (II) 4,4',4'',4'''-tetranitro phthalocyanine was placed in 250 ml water. To this slurry 50 g of sodium sulfide nonahydrate was added and stirred at 50° C. for 5 hours. The solid product was separated by centrifuging the reaction mixture and treated with 750 ml of 1.0N hydrochloric acid. The bulky blue precipitate of copper (II) tetraamino phthalocyanine hydrochloride was separated by centrifugation. It was then treated with 500 ml of 1.0N sodium hydroxide, stirred for 1 hour and centrifuged to separate the dark green solid complex. The product was repeatedly treated with water, stirred and centrifuged until the material was free from sodium chloride and sodium hydroxide. The pure copper complex was dried at 150° C. for 2 hours.

Compound $C_{32}H_{20}N_{12}Cu$ (CuPTA), Yield 98%.

Calcd: C, 60.42; H, 3.17; N, 26.42; Cu, 9.99; Found: C, 60.66; H, 3.4; N, 26.25; Cu, 10.1.

IR absorption bands (cm$^{-1}$) 3289 w, 3178 w, 3079 w, 1603 s, 1409 m, 1341 s, 1302 s, 1249 m, 1135 m, 1096 m, 1053 m, 977 w, 942 w, 861 w, 820 w, 809 w, 776 w, 744 mw, 730 mw.

EXAMPLES 5 AND 6

Cobalt and nickel 4,4',4'',4'''tetraamino phthalocyanines, (compounds 1b and 1c)

These (having structure 1 with M=Co (II) and Ni (II)) were prepared by the same method as in Example 4. Their structures were verified by chemical and infrared analyses.

The phthalocyanines are characteristically difficult to polymerize because of their insolubility, steric hindrance, etc. In accordance with the present invention the tetraamino derivatives 1 are advantageously employed because of their solubility in solvents such as dimethylsulfoxide (DMSO), dimethyl formamide (DMF), dimethyl acetamide (DMAc) and N-methyl pyrrolidone (NMP). A solution of this monomer in an aprotic solvent such as DMAc or DMF is reacted with a dianhydride 3 thus introducing linking groups

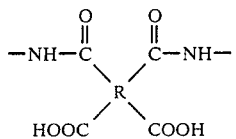

9 between the phthalocyanine groups. The resulting polymers (amic acids) 4 are soluble in the solvents mentioned above. They can be cyclized by dehydration to yield polymers 5. If the polymerization is carried out in the presence of a diamine 6, then copolymers 7 result. These polymers can be cyclized to polymers 8.

The following specific examples are illustrative.

EXAMPLE 7

Polymerization of the copper phthalocyanine (1a) with 3,3',4,4'-benzophenone tetracarboxylic dianhydride (3a)

1.0 g of copper (II) 4,4',4'',4'''-tetraamino phthalocyanine was placed in a three-necked flask containing 75.0 ml of dry dimethyl sulfoxide as a solvent. The flask was fitted with a nitrogen inlet, glass stopper and a calcium chloride drying tube. Nitrogen was bubbled through the clear solution. To the vigorously stirred solution, 1.013 g, 3,3',4,4'-benzophenone tetracarboxylic dianhydride was added all at once. The dark green color of the solution turned to a pure green color after 5–10 minutes. The solution was stirred for 1 hour in a current of dry nitrogen. Dimethyl sulfoxide was removed in a circulating air oven at 70° C. The polymer 4a (an amic acid) resulted.

The cobalt and nickel species were similarly prepared.

EXAMPLE 8

Dehydrocyclization of polymer 4a

The polymer 4a resulting from Example 7 was heated at 300° C. for one hour in vacuum to yield the polymer 5a.

The cobalt and nickel species were prepared similarly.

Further, the polymers of the tetraamino phthalocyanine (M=Cu, Co, Ni) and 1,2,4,5-benzene tetracarboxylic dianhydride (3b) were similarly prepared in the amic acid form 4b and in the dehydrocyclized form 5b.

EXAMPLE 9

Copolymerization of the tetraamino phthalocyanine (1a), the dianhydride (3a) and 4,4'-diaminodiphenyl ether (6a)

Finely ground 0.795 g copper (II) 4,4'4'',4'''-tetraamino phthalocyanine and 1.502 g 4,4'-diamino diphenyl ether were placed in a three-necked flask containing 138 ml of dry dimethyl sulfoxide as the solvent. The flask was fitted with a nitrogen inlet, glass stopper and a calcium chloride drying tube. Dry nitrogen gas was bubbled through the clear solution. To the vigorously stirred solution, 3.222 g of 3,3',4,4'-benzophenone tetracarboxylic dianhydride were added in small portions. The dark color of the solution turned to a lighter green after 5–10 minutes and the viscosity of the solution gradually increased. A thick viscous solution, >3.0 dl/g, was obtained after 2 hours stirring in a current of nitrogen. The solution can either be used to cast film or the polymer can be precipitated with toluene. After removing the solvent at 75° C., thermal cyclization can be carried out either by heating at 325° C. in vacuum for 1 hour or by heating at 350° C. in a current of nitrogen for 1.5 hours.

Tables 1 and 2 summarize results obtained with polymers prepared by polymerizing the indicated tetraamino metal phthalocyanine with 3,3',4,4'-benzophenone tetracarboxylic dianhydride (Table 1) or with 1,2,4,5-benzene tetracarboxylic dianhydride (Table 2). Wherever in these tables a tetraamine appears alone in the column headed Amines, the polymerization was between the tetraamino phthalocyanine and the indicated dianhydride alone, and wherever a second amine is indicated the polymerization was a co-polymerization of the tetraamino phthalocyanine, the indicated second amine and the indicated dianhydride. Numbers in parentheses indicate gram proportions. BPTDA is 3,3',4,4'-benzophenone tetracarboxylic dianhydride. DMSO is dimethyl sulfoxide. PDT is polymer decomposition temperature. PTA is 4,4',4'',4'''-tetraamino phthalocyanine. DADPE is 4,4'-diamino diphenyl ether. PDA is p-phenylene diamine, DADPM is 4,4'-diamino diphenyl methane. BAF is 9,9-bis(4'-amino phenyl)fluorene. PMDA is pyromellitic dianhydride.

TABLE 1

| | | Polymer Amines (g) | BPTDA (g) | DMSO (ml) | AIR PDT (°C.) | NITROGEN PDT (°C.) | NITROGEN CHAR YIELD %: 800° C. |
|---|---|---|---|---|---|---|---|
| No. | | | | | | | |
| 1 | CuPTA | (1.0) | 1.013 | 75 | 505 | 575 | 83 |
| 2 | CoPTA | (1.0) | —.— | —.— | 530 | 550 | 81 |
| 3 | NiPTA | (1.0) | —.— | —.— | 500 | 565 | 80 |
| 4 | CuPTA | (0.795) + DADPE (1.502) | 3.222 | 123 | 520 | 565 | 72 |
| 5 | CoPTA | (0.790) + —.— | —.— | —.— | 530 | 560 | 68 |
| 6 | NiPTA | (0.789) + —.— | —.— | —.— | 530 | 550 | 69 |
| 7 | CuPTA | (0.795) + PDA (0.811) | —.— | 121 | 522 | 565 | 71 |
| 8 | CoPTA | (0.790) + —.— | —.— | —.— | 525 | 570 | 70 |
| 9 | NiPTA | (0.789) + —.— | —.— | —.— | 540 | 560 | 70 |
| 10 | CuPTA | (0.795) + DADPM (1.487) | —.— | 122 | 525 | 540 | 72 |
| 11 | CoPTA | (0.790) + —.— | —.— | —.— | 528 | 548 | 70 |

TABLE 1-continued

| | Polymers from 3,3',4,4'-Benzophenone Tetracarboxylic Dianhydride (BPTDA) | | | | | | |
|---|---|---|---|---|---|---|---|
| | POLYMER | | | | AIR | NITROGEN | |
| No. | Amines (g) | | BPTDA (g) | DMSO (ml) | PDT (°C.) | PDT (°C.) | CHAR YIELD %; 800° C. |
| 12 | NiPTA | (0.789) — —,— | —,— | —,— | 540 | 545 | 71 |
| 13 | CuPTA | (0.795) + BAF (2.614) | —,— | 133 | 527 | 560 | 77 |
| 14 | CoPTA | (0.790) + —,— | —,— | —,— | 526 | 560 | 76 |
| 15 | NiPTA | (0.789) + —,— | —,— | —,— | 540 | 575 | 76 |

TABLE 2

| | Polymers from 1,2,4,5-Benzene Tetracarboxylic Dianhydride (Pyromellitic Dianhydride, PMDA) | | | | | | |
|---|---|---|---|---|---|---|---|
| | POLYMER | | | | AIR | NITROGEN | |
| No. | Amines (g) | | PMDA (g) | DMSO (ml) | PDT (°C.) | PDT (°C.) | CHAR YIELD %; 800° C. |
| 1 | CuPTA | (1.0) | 0.691 | 75 | 510 | 560 | 80 |
| 2 | CoPTA | (1.0) | —,— | —,— | 520 | 550 | 75 |
| 3 | NiPTA | (1.0) | —,— | —,— | 505 | 552 | 78 |
| 4 | CuPTA | (0.795) + DADPE (1.502) | 2.181 | 128 | 520 | 568 | 70 |
| 5 | CoPTA | (0.790) + —,— | —,— | —,— | 532 | 543 | 73 |
| 6 | NiPTA | (0.789) + —,— | —,— | —,— | 535 | 555 | 70 |
| 7 | CuPTA | (0.795) + PDA (0.811) | —,— | 126 | 525 | 550 | 69 |
| 8 | CoPTA | (0.790) + —,— | —,— | —,— | 530 | 575 | 68 |
| 9 | NiPTA | (0.789) + —,— | —,— | —,— | 540 | 545 | 73 |
| 10 | CuPTA | (0.795) + DADPM (1.487) | —,— | 128 | 515 | 550 | 70 |
| 11 | CoPTA | (0.790) + —,— | —,— | 127 | 528 | 548 | 70 |
| 12 | NiPTA | (0.789) + —,— | —,— | —,— | 540 | 546 | 73 |
| 13 | CuPTA | (0.795) + BAF (2.614) | —,— | 133 | 527 | 560 | 76 |
| 14 | CoPTA | (0.790) + —,— | —,— | 124 | 526 | 560 | 76 |
| 15 | NiPTA | (0.789) + —,— | —,— | —,— | 526 | 541 | 80 |

It will be apparent that other dianhydrides and other diamines may be employed. If a greater degree of cross linking is desired anhydrides and/or amines of higher functionality than two may be used. However, the resulting polymers are likely to be intractable, insoluble materials. The phthalocyanine structure may have substituents on the benzene rings, e.g. methyl, ethyl, etc. provided they do not interfere with the copolymerization reaction and the anhydride and amine reactants may likewise have such substituents subject to the same proviso. Such substituents may be hydrocarbon or they may be or may contain hetero atoms such as, for example, chlorine, methoxy, etc.

Examples of suitable dianhydrides are 1,2,4,5-benzene tetracarboxylic dianhydride; bis(3,4-dicarboxyphenyl)ether dianhydride; 2,3,5,6-pyrazine tetracarboxylic dianhydride; 2,3,4,5-thiophene tetracarboxylic dianhydride; 3,3',4,4'-diphenyl tetracarboxylic dianhydride; 2,3,6,7-naphthalene tetracarboxylic dianhydride; 1,2,5,6-naphthalene tetracarboxylic dianhydride; 1,4,5,8-naphthalene tetracarboxylic dianhydride; 2,6- (and 2,7-)dichloronaphthalene-1,4,5,8-tetracarboxylic dianhydride; 2,3,6,7-tetrachloronaphthalene, 1,4,5,8-tetracarboxylic dianhydride; 1,8,9,10-phenanthrene tetracarboxylic dianhydride; 3,4,9,10-perylene tetracarboxylic dianhydride and the like. Preferred dianhydrides are 3,3',4,4'-benzophenone tetracarboxylic dianhydride; 1,2,4,5-benzene tetracarboxylic dianhydride; 2,3,5,6-pyrazine tetracarboxylic dianhydride; and 1,4,5,8-naphthalene tetracarboxylic dianhydride. The most preferred ones are 3,3',4,4'-benzophenone tetracarboxylic dianhydride and 1,2,4,5-benzene tetracarboxylic dianhydride. Alicyclic dianhydrides may be used but aromatic dianhydrides are preferred. An example of an alicyclic dianhydride is the following:

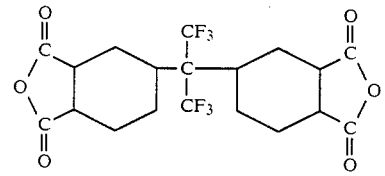

Dianhydrides resulting from the hydrogenation of pyromellitic dianhydride and of benzophenone tetracarboxylic acid dianhydride may be used.

It has been observed that MPTA/dianhydride polymers prepared with 3,3',4,4'-benzophenone tetracarboxylic dianhydride and 1,2,4,5-benzene tetracarboxylic dianhydride have high decomposition temperatures, e.g. 505°–565° C. in air and 550°–575° C. in nitrogen and that they have a high char yield but they do not have a high degree of polymerization as shown by inherent viscosity measurements (0.35–0.42 dl/g). This is believed to be due to steric hindrance which is overcome by the use of linking groups derived from diamines. By varying the length of the connecting group derived from the diamine, this factor (degree of polymerization) can be controlled and extended while preserving heat resistance. By using diamines of different lengths, medium to infinite degrees of polymerization can be achieved.

Among diamines that may be used are 4,4'-diaminodiphenyl ether; 4,4'-diamino diphenyl methane; 4,4'-diamino diphenyl phenyl phosphine oxide; 4,4'-diamino diphenyl sulfide; 4,4'-diamino diphenyl silane; benzidine; 3,3'-dichloro benzidine; 1,5-diamino naphthalene; 3,3'-dimethyl-4,4'-diamino diphenyl ether; 3,3'-diethyl-4,4'-diamino diphenyl ether; 3,3'-dimethoxy-4,4'-diamino diphenyl ether; 3,3'-diethoxy-4,4'-diamino diphenyl ether; 3,3'-dichloro-4,4'-diamino-diphenyl ether; 3,3'-dibromo-4,4'-diamino-diphenyl ether; 4,4'-diamino-stilbene; 4,4'-diamino diphenyl propane; 4,4'-diamino diphenyl sulfone; 3,3'-diamino-diphenyl sulfone; 4,4'-diamino diphenyl diethyl silane; 4,4'-diamino diphenyl N-phenyl-amine; 3,3'-dimethyl-4,4'-diamino diphenyl methane; 3,3'-diethyl-4,4'-diamino diphenyl methane; 3,3'-dimethoxy-4,4'diamino diphenyl methane; 3,3'-diethoxy-4,4'-diamino diphenyl methane; 3,3'-dichloro-4,4'-diamino diphenyl methane; 3,3'-dibromo-4,4'-diamino diphenyl methane; 3,3'-dimethyl-4,4'-diamino diphenyl sulfide; 3,3'-diethyl-4,4'-diamino diphenyl sulfide; 3,3'-dimethoxy-4,4'-diamino diphenyl sulfide; 3,3'-diethoxy-4,4'-diamino diphenyl sulfide; 3,3'-dichloro-4,4'-diamino diphenyl sulfide; 3,3'-dibromo-4,4'-diamino diphenyl sulfide; 3,3'-dimethyl-4,4'-diamino diphenyl sulfone; 3,3'-dichloro-4,4'-diamino diphenyl sulfone; 3,3'-diethoxy-4,4'-diamino diphenyl sulfone; 3,3'-diethyl-4,4'-diamino diphenyl propane; 3,3'-dimethoxy-4,4'-diamino diphenyl propane; 3,3'-dibromo-4,4'-diamino diphenyl propane; 3,3'-dichloro-4,4'-diamino diphenyl propane; 3,3'-dimethyl-4,4'-diamino benzophenone; 3,3'-dimethoxy-4,4'-diamino benzophenone; 3,3'-dichloro-4,4'-diamino benzophenone, 3,3'-dibromo-4,4'-diamino benzophenone; 3,3'-diamino-diphenyl ether; 3,3'-diamino diphenyl sulfide; 3,3'-diamino diphenyl sulfone; p-phenylene diamine; m-phenylene diamine, 9,9-bis(4-amino phenyl)fluorene; 3,3'-diamino diphenyl propane; 3,3'-diamino benzophenone and the like. The most preferred diamines are: 4,4'-diamino-diphenyl ether, p-phenylene diamine; 3,3'-diamino diphenyl methane; and 9,9-bis(4'-aminophenyl)fluorene.

Although aromatic amines are prefered, aliphatic diamines such as the following may be used: ethylene diamine, and other alkylene diamines, e.g. tetramethylene diamines and hexamethylene diamines; cycloaliphatic diamines such as 1,4-diamino cyclohexane, etc. It will be apparent that mixtures of two or more dianhydrides and of two or more diamines may be used.

In reducing the tetranitro compounds 2 to the tetraamino compounds 1, a wide variety of reducing agents may be used, e.g., stannous chloride, sulfides such as sodium sulfide, hydrogenation and iron/acetic acid.

Solvents for preparation of the tetranitro precursor 2 and for the reduction of the nitro compound 2 to the tetraamino compound 1 include dimethyl sulfoxide, dimethyl formamide, dimethyl acetamide, N-methyl pyrrolidone, and pyrrolidone. Similar silvents may be used in the polymerization and co-polymerization reactions.

Any mono-, di- or higher valency metal M may be used in place of divalent copper, cobalt and nickel, e.g., Cu(I), cobalt and nickel in other valence states, Fe(II), Fe(III), Zn, Al, lead, tin, palladium, germanium, vanadium, platinum and molybdenum in various valence states; monovalent metals such as Li, Na and K, etc. Where the metal is monovalent two atoms will be present, one atom above and the other atom below the plane of the phthalocyanine molecule. With a trivalent metal such as aluminum, one of the valences may be satisfied by a ligand such as Cl, F, acetate, etc., e.g., the metallic compound can be represented as M'X where M' is the metal atom and X is an inorganic atom or radical or an organic group.

Preferably the metal is divalent and has an atomic radius close to 1.35 Å. Metals of substantially larger atomic radius may not fit well into the molecule and metals having a substantially smaller atomic radius are more likely to be extracted by strong acids, e.g., concentrated sulfuric acid. Metals having ligands may be susceptible to hydrolytic action.

Any soluble salt or hydroxide of the selected metal may be used provided the counter ion is compatible with the reactants and the reaction product. For example, the metal M may be used in the form of its sulfate, chloride, nitrate, acetate, oxalate, etc. Also, it may be used in the form of a finely divided metallic powder. Preferably the reactants are used in approximately stoichiometric proportions. The ammonium chloride may be used alone as the catalyst but the use of ammonium molybdate as well allows the reaction to proceed at a lower temperature and increases the yield.

Nitrobenzene is an advantageous solvent because, besides being unreactive and being a good solvent for the reactants, it has a high boiling point (210° C.). Other aprotic solvents such as quinoline and tetralin may be used. Yields of 90% or more are obtainable.

The metal M may be removed from the molecule as by dissolving it in concentrated sulfuric acid to produce the hydrogen (protonated) species in which each of the two covalent bonds is connected to hydrogen. The protonated species may then be treated with an alcoholic solution of a metal salt, e.g., copper sulfate, to insert the metal, e.g., Cu(II). In this way one metal may be substituted for another. However, it is preferred to choose the desired metal initially and to insert it in the phthalocyanine molecule in the synthesis of the tetranitro compound 2.

The copolymerization of MPTA, dianhydride and diamine is carried out stepwise. In the first step copolymerization to the amic acid is effected, then decarboxylation is effected. In the first step a solvent is used, e.g. DMSO or DMAc (dimethyl acetamide). The preferred solvent is dimethyl sulfoxide. The temperature of the reaction can be varied between 20°–50° C. with the optimum being 20°–30° C. The second step of the reaction can be carried out either by thermal cyclization or azeotroping the water of cyclization or by boiling in glacial acetic acid and refluxing in the presence of fused sodium acetate. The most efficient and convenient route for this purpose is the thermal cyclization method. Heating at 325° C. for 1 hour in vacuum is found to be sufficient to complete the reaction. These copolymers are thermally very stable. Polymer decomposition temperature is greater than 500° C. in both air and nitrogen atmospheres. These polymers are very resistant to thermal degradation in anerobic atmosphere and their char yield varies between 65–80 at 800° C. depending upon the amines, dianhydride and their molar concentrations used. The inherent viscosities obtained vary between 0.75 and >3.0 dl/g. The most preferred ratio of the molar concentrations of the metal 4,4',4'',4'''-tetra-amino phthalocyanine, the diamine and the dianhydride is 1.25:7.5:10. Most desirable concentration range of the polymer for the reaction is 3 to 5%. The polymer and copolymers of the present invention are useful for preparing high temperature resistant films, varnishes, adhesives and fibers.

It will therefore be apparent that new and useful polymers, polymer precursors, and methods of synthesis and polymerization have been provided.

We claim:

1. A method of forming polymers of a metal 4,4',4'',4''' tetraamino phthalocyanine which comprises reacting the metal 4,4',4'',4'''-tetraamino phthalocyanine in liquid phase at about 20° C. to about 50° C. with a tetracarboxylic dianhydride of the formula

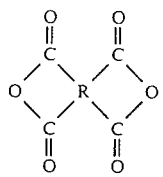

wherein R is an organic group selected from the group consisting of aromatic and alicyclic groups to produce an amic acid polymer having a

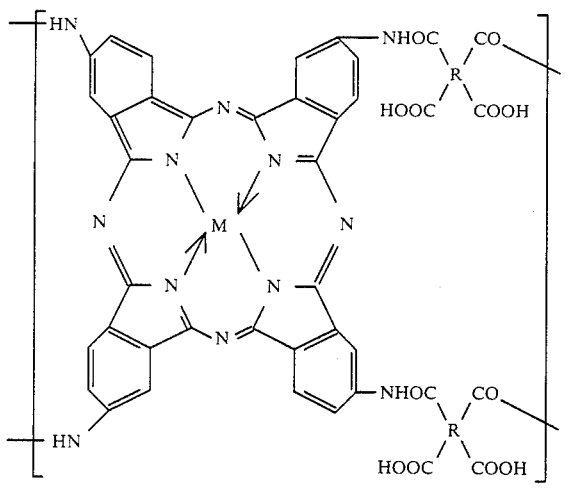

recurring unit wherein M is the metal and R is the organic group of the dianhydride.

2. The method of claim 1 wherein M is a divalent metal having an atomic radius of approximately 1.35 Å.

3. The method of claim 1 wherein the dianhydride is an aromatic dianhydride.

4. The method of claim 3 wherein the dianhydride is 1,2,4,5-benzene tetracarboxylic dianhydride.

5. The method of claim 3 wherein the dianhydride is 3,3',4,4'-benzophenone tetracarboxylic dianhydride.

6. The method of claim 1 comprising the additional step of dehydrocyclizing the amic acid polymer by a process selected from thermal cyclization, azeotroping water of cyclization, refluxing in glacial acetic acid in the presence of fused sodium acetate to produce an imide polymer having the recurring unit

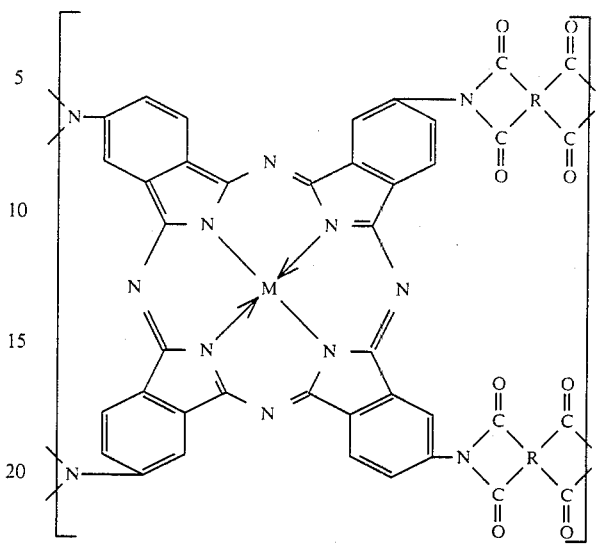

7. The method of claim 6 wherein the metal M is a divalent metal having an atomic radius about 1.35 Å.

8. The method of claim 6 wherein the dianhydride is aromatic.

9. The method of claim 8 wherein the dianhydride is 1,2,4,5-benzene tetracarboxylic dianhydride.

10. The method of claim 8 wherein the dianhydride is 3,3',4,4'-benzophenone tetracarboxylic dianhydride.

11. A method of forming polymers of a metal 4,4',4'',4'''-tetraamino phthalocyanine which comprises reacting the metal 4,4',4'',4'''-tetraamino phthalocyanine in liquid phase at a temperature of from about 20° C. to about 50° C. with a tetracarboxylic dianhydride of the formula

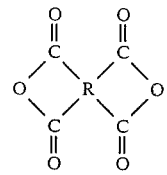

wherein R is an organic group selected from the group consisting of aromatic and alicyclic groups, and a diamine of the formula $H_2N-R'-NH_2$ wherein R' is a bivalent organic group selected from the group consisting of bivalent aliphatic groups, bivalent cycloaliphatic groups, and bivalent aromatic groups to yield an amic acid copolymer.

12. The method of claim 11 wherein the metal is a divalent metal having an atomic radius about 1.35 Å.

13. The method of claim 11 wherein the dianhydride is aromatic.

14. The method of claim 11 wherein the diamine is aromatic.

15. The method of claim 11 wherein both R and R' are aromatic.

16. The method of claim 1 comprising the additional step wherein the amic acid copolymer is dehydrocyclized by a process selected from thermal cyclization, azeotroping water of cyclization, refluxing in glacial acetic acid in the presence of fused sodium acetate to produce a polymer having the recurring unit

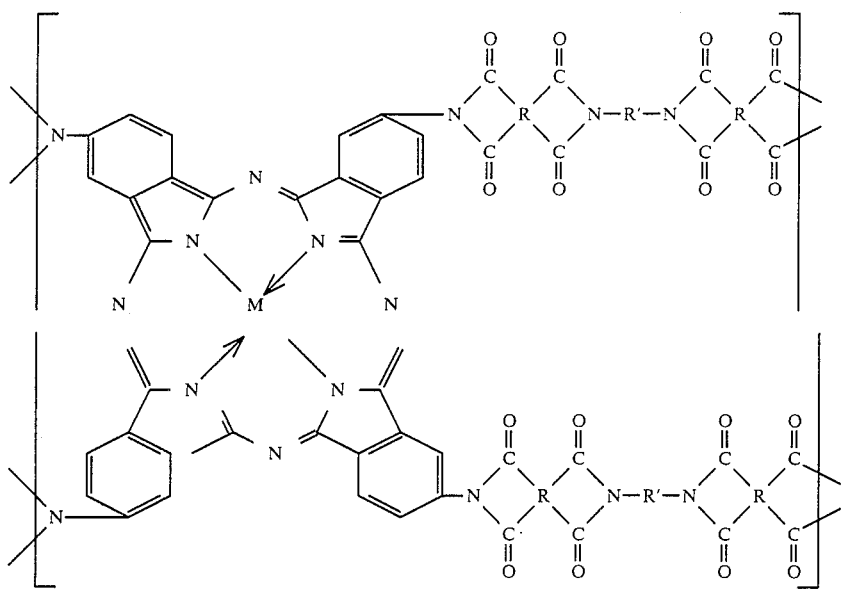

wherein R is an organic group selected from the group consisting of aromatic and alicyclic groups which are derived from the dianhydride and R' is an organic group selected from the group consisting of aromatic, aliphatic and cycloaliphatic groups which are derived from the diamine.

17. The method of claim 16 wherein M is a divalent metal having an atomic radius about 1.35 Å.

18. The method of claim 16 wherein the dianhydride is aromatic.

19. The method of claim 16 wherein the diamine is aromatic.

20. The method of claim 16 wherein both the dianhydride and the diamine are aromatic.

21. Polymers having the following recurring unit wherein M is a metal and R is an organic group derived from a dianhydride and selected from the group consisting of aromatic groups and alicyclic groups 24. Polymers of claim 23 wherein the dianhydride is 1,2,3,4-benzene tetracarboxylic dianhydride.

25. Polymers of claim 23 wherein the dianhydride is 3,3',4,4'-benzophenone tetracarboxylic dianhydride.

26. Polymers having the following recurring unit wherein M is a metal and R is an organic group derived from a dianhydride and selected from the group consisting of aromatic groups and alicyclic groups

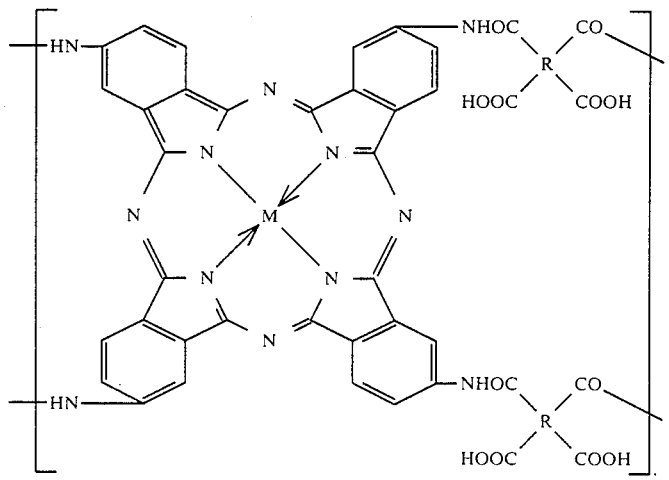

22. Polymers of claim 21 wherein M is divalent and has an atomic radius about 1.35 Å.

23. Polymers of claim 21 wherein R is an aromatic group derived from an aromatic dianhydride.

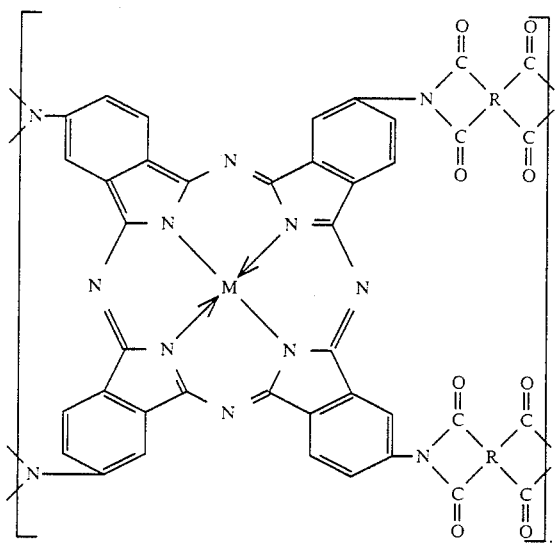

27. Polymers of claim 26 wherein M is a divalent metal having an atomic radius about 1.35 Å.

28. Polymers of claim 26 wherein the dianhydride is aromatic.

29. Polymers of claim 28 wherein the dianhydride is 1,2,3,4-benzene tetracarboxylic dianhdride.

30. Polymers of claim 28 wherein the dianhydride is 3,3',4,4'-benzophenone tetracarboxylic dianhydride.

31. Copolymers of a metal 4,4',4'',4'''-tetraamino phthalocyanine, a tetracarboxylic dianhydride selected from the group consisting of aromatic tetracarboxylic dianhydrides and alicyclic tetracarboxylic dianhydrides and a diamine selected from aromatic diamines, aliphatic diamines and cycloaliphatic diamines.

32. Polymers of claim 3 wherein the metal is a divalent metal having an atomic radius about 1.35 Å.

33. Polymers of claim 31 wherein the dianhydride is aromatic.

34. Polymers of claim 31 wherein the diamine is aromatic.

35. Polymers of claim 31 wherein both the dianhydride and the diamine are aromatic.

36. Polymers having the following recurring unit wherein M is a metal, R is an organic group selected from aromatic and alicyclic groups derived from a dianhydride and R' is an organic group selected from aromatic groups, cycloaliphatic groups and aliphatic groups derived from a diamine

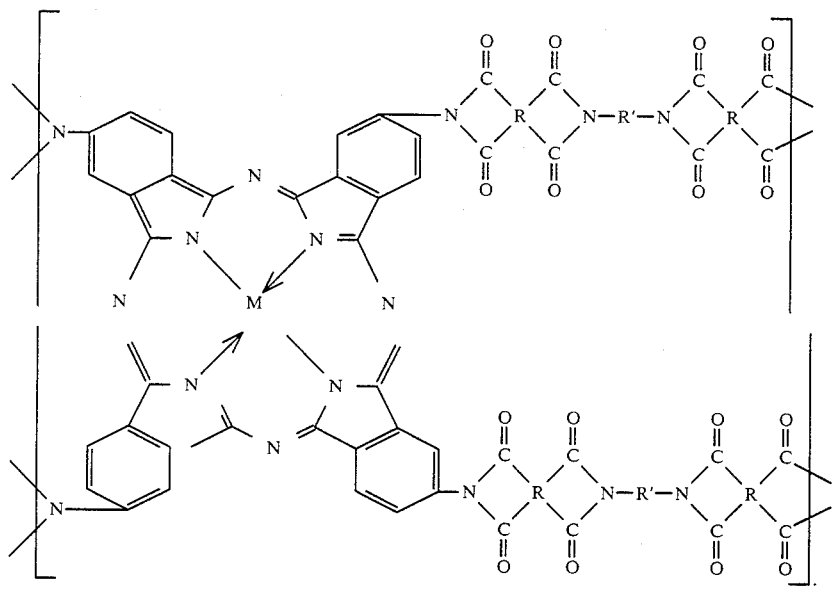

37. Polymers of claim 36 wherein M is a divalent metal having an atomic radius about 1.35 Å.

38. Polymers of claim 36 wherein the dianhydride is aromatic.

39. Polymers of claim 36 wherein the diamine is aromatic.

40. Polymers of claim 36 wherein both the dianhydride and the diamine are aromatic.

* * * * *